US011888264B2

(12) United States Patent
Chen et al.

(10) Patent No.: US 11,888,264 B2
(45) **Date of Patent: *Jan. 30, 2024**

(54) ELECTRICAL CONNECTOR WITH IMPROVED ELECTRICAL PERFORMANCE

(71) Applicant: Dongguan Luxshare Technologies Co., Ltd, Dongguan (CN)

(72) Inventors: Hongji Chen, Dongguan (CN); Xiaoping Wu, Dongguan (CN); Bin Huang, Dongguan (CN); Haohan Chen, Dongguan (CN)

(73) Assignee: Dongguan Luxshare Technologies Co., Ltd, Dongguan (CN)

( * ) Notice: Subject to any disclaimer, the term of this patent is extended or adjusted under 35 U.S.C. 154(b) by 0 days.

This patent is subject to a terminal disclaimer.

(21) Appl. No.: 18/091,047

(22) Filed: Dec. 29, 2022

(65) Prior Publication Data

US 2023/0136453 A1 May 4, 2023

Related U.S. Application Data

(63) Continuation of application No. 17/703,454, filed on Mar. 24, 2022, now Pat. No. 11,569,619, which is a (Continued)

(30) Foreign Application Priority Data

Sep. 7, 2019 (CN) ......................... 201921488180.7
Sep. 7, 2019 (CN) ......................... 201921494812.0
Jan. 7, 2020 (CN) ......................... 202010015943.7

(51) Int. Cl.
*H01R 13/6471* (2011.01)
*H01R 13/40* (2006.01)
(Continued)

(52) U.S. Cl.
CPC ......... *H01R 13/6471* (2013.01); *H01R 12/55* (2013.01); *H01R 13/2464* (2013.01);
(Continued)

(58) Field of Classification Search
CPC ........... H01R 13/6599; H01R 13/6461; H01R 13/6473; H01R 13/2464; H01R 13/6471;
(Continued)

(56) References Cited

U.S. PATENT DOCUMENTS 7,163,421 B1 1/2007 Cohen et al.
7,371,117 B2 5/2008 Gailus
(Continued)

FOREIGN PATENT DOCUMENTS

CN 208014938 U 10/2018
CN 208862209 U 5/2019

OTHER PUBLICATIONS

"High-Loss, Thin, Elastomeric Microwave Absorber," Laird Technologies Inc., 2015, pp. 1-2.
(Continued)

*Primary Examiner* — Marcus E Harcum
(74) *Attorney, Agent, or Firm* — Birch, Stewart, Kolasch & Birch, LLP

(57) ABSTRACT

An electrical connector includes an insulating housing, a number of terminals and a lossy member. The terminals include a number of ground terminals and a number of signal terminals. The ground terminals and the signal terminals are set adjacently to each other but do not contact each other. The ground terminals do not directly contact the lossy member. As a result, installation consistency of the ground terminals can be achieved, thereby improving the electrical performance of the electrical connector.

18 Claims, 29 Drawing Sheets

Related U.S. Application Data continuation of application No. 17/005,053, filed on Aug. 27, 2020, now Pat. No. 11,316,304.

(51) Int. Cl.

| | |
|---|---|
| ***H01R 12/55*** | (2011.01) |
| ***H01R 13/24*** | (2006.01) |
| ***H01R 13/6586*** | (2011.01) |
| ***H01R 13/502*** | (2006.01) |

(52) U.S. Cl.

CPC ........... *H01R 13/40* (2013.01); *H01R 13/502* (2013.01); *H01R 13/6586* (2013.01)

(58) Field of Classification Search

CPC .. H01R 13/40; H01R 13/502; H01R 13/6586; H01R 12/55; H01R 12/721; H01R 12/724; H01R 12/727

USPC ..................................... 439/637, 86, 88, 941

See application file for complete search history.

(56) References Cited

U.S. PATENT DOCUMENTS

| | | | |
|---|---|---|---|
| 7,581,990 | B2 | 9/2009 | Kirk et al. |
| 8,167,652 | B1 | 5/2012 | Ju |
| 8,177,564 | B1 | 5/2012 | Ito et al. |
| 8,523,583 | B2 | 9/2013 | Ito |
| 8,926,377 | B2 | 1/2015 | Kirk et al. |
| 9,065,230 | B2 | 6/2015 | Milbrand, Jr. |
| 9,337,585 | B1 | 5/2016 | Yang |
| 9,409,331 | B2 | 8/2016 | Liu et al. |
| 9,431,768 | B1 | 8/2016 | Champion et al. |
| 9,472,900 | B1 | 10/2016 | Phillips et al. |
| 9,531,130 | B1 | 12/2016 | Phillips et al. |
| 9,577,370 | B2 | 2/2017 | Lin et al. |
| 9,666,998 | B1 | 5/2017 | Du Boer et al. |
| 9,768,557 | B2 | 9/2017 | Phillips et al. |
| 9,859,635 | B1 | 1/2018 | Pickel et al. |
| 9,972,945 | B1 | 5/2018 | Huang et al. |
| 10,122,129 | B2 | 11/2018 | Milbrand, Jr. et al. |
| 10,135,197 | B2 | 11/2018 | Little et al. |
| 10,283,910 | B1 | 5/2019 | Chen et al. |
| 10,367,308 | B2 | 7/2019 | Little et al. |
| 10,411,376 | B1 | 9/2019 | Wang et al. |
| 10,476,192 | B2 | 11/2019 | Huang et al. |
| 10,644,455 | B1 | 5/2020 | Champion |
| 10,777,921 | B2 | 9/2020 | Lu et al. |
| 10,916,891 | B2 | 2/2021 | Hsu et al. |
| 10,944,189 | B2 | 3/2021 | Xu et al. |
| 11,025,013 | B2 | 6/2021 | Little |
| 11,108,194 | B2 | 8/2021 | Lin et al. |
| 2006/0234556 | A1 | 10/2006 | Wu |
| 2009/0111325 | A1 | 4/2009 | Ju |
| 2012/0202363 | A1 | 8/2012 | McNamara et al. |
| 2012/0282808 | A1 | 11/2012 | Luo et al. |
| 2013/0052843 | A1 | 2/2013 | Johnescu et al. |
| 2013/0178115 | A1 | 7/2013 | Ao et al. |
| 2014/0127946 | A1 | 5/2014 | Ito et al. |
| 2014/0273627 | A1 | 9/2014 | Cartier, Jr. et al. |
| 2015/0031240 | A1 | 1/2015 | Yang et al. |
| 2015/0188250 | A1 | 7/2015 | Liu et al. |
| 2015/0255904 | A1 | 9/2015 | Ito |
| 2015/0288108 | A1 | 10/2015 | Fischer |
| 2016/0104956 | A1 | 4/2016 | Santos et al. |
| 2017/0170606 | A1 | 6/2017 | Phillips et al. |
| 2018/0062323 | A1 | 3/2018 | Kirk et al. |
| 2019/0097357 | A1 | 3/2019 | Mongold et al. |
| 2019/0148887 | A1 | 5/2019 | Chen et al. |
| 2019/0190210 | A1 | 6/2019 | Zhong et al. |
| 2019/0293884 | A1 | 9/2019 | Little |
| 2019/0296469 | A1 | 9/2019 | Stokoe et al. |
| 2020/0076132 | A1 | 3/2020 | Yang et al. |
| 2020/0076135 | A1 | 3/2020 | Tang et al. |
| 2020/0266584 | A1 | 8/2020 | Lu |
| 2020/0350731 | A1 | 11/2020 | Buck et al. |
| 2020/0412060 | A1 | 12/2020 | Hsieh et al. |
| 2021/0044060 | A1 | 2/2021 | Wu et al. |
| 2021/0075163 | A1 | 3/2021 | Takai et al. |
| 2021/0126385 | A1 | 4/2021 | Zhang et al. |
| 2021/0135389 | A1 | 5/2021 | Jiang |

OTHER PUBLICATIONS

U.S. Office Action for U.S. Appl. No. 17/005,053, dated Sep. 10, 2021.

ELECTRICAL CONNECTOR WITH IMPROVED ELECTRICAL PERFORMANCE

CROSS-REFERENCE TO RELATED APPLICATIONS

This application is a continuation of U.S. patent application Ser. No. 17/703,454, filed on Mar. 24, 2022, which is a continuation of U.S. patent application Ser. No. 17/005,053, filed on Aug. 27, 2020, which claims priorities of a Chinese Patent Application No. 202010015943.7, filed on Jan. 7, 2020 and titled "ELECTRICAL CONNECTOR", a Chinese Patent Application No. 201921494812.0, filed on Sep. 7, 2019 and titled "ELECTRICAL CONNECTOR", and a Chinese Patent Application No. 201921488180.7, filed on Sep. 7, 2019 and titled "ELECTRICAL CONNECTOR", the entire content of which is incorporated herein by reference.

TECHNICAL FIELD

The present disclosure relates to an electrical connector, in particular to a high-speed electrical connector for data transmission.

BACKGROUND

Existing high-speed electrical connectors usually include a plurality of signal terminals and a plurality of ground terminals. The signal terminals are differential signal terminals in some high-speed electrical connectors. In order to reduce the mutual influence of the signal terminals during data transmission and the influence of the external environment, the ground terminals are usually arranged at both sides of each pair of differential signal terminals.

Even so, when data is being transmitted at high speed, the signal terminals will still be subject to some interference. In order to further reduce this interference, engineers in the art try to add lossy member to the electrical connector. Experiments show that this has positive significance for reducing signal interference. Lossy member is usually connected with the ground terminal. However, when assembling the lossy member, it is easy to happen that some ground terminals can contact the lossy member, and some ground terminals cannot reliably contact the lossy member. That is, positional relationship between the lossy member and the ground terminal during assembly lacks high consistency, which affects the electrical performance of the electrical connector.

SUMMARY

An object of the present disclosure is to provide an electrical connector with better electrical performance.

In order to achieve the above object, the present disclosure provides an electrical connector comprising an insulating housing, a plurality of terminals and a lossy member. The terminals comprise a plurality of ground terminals and a plurality of signal terminals. The ground terminals and the signal terminals are set adjacently to each other but do not contact each other. The ground terminals do not directly contact the lossy member.

Compared with the prior art, by having the lossy member and the ground terminal be not in direct contact, installation consistency of the ground terminals can be achieved, thereby improving the electrical performance of the electrical connector.

DETAILED DESCRIPTION

Referring to FIGS. 1 to 4, the present disclosure discloses an electrical connector 100 which includes an insulating housing 1 and a terminal module 2 assembled to the insulating housing 1. In an embodiment of the present disclosure, the electrical connector 100 is an SFP board connector.

Figure 1:
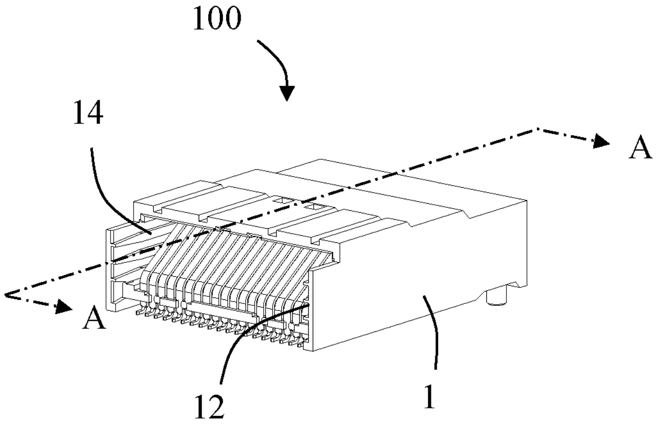
FIG. 1 is a perspective view of an electrical connector in accordance with a first embodiment of the present disclosure.
Figure 2:
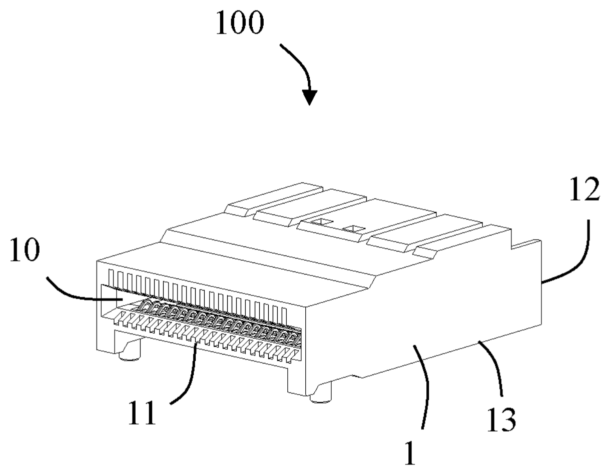
FIG. 2 is another perspective view of FIG. 1 from another angle.
Figure 3:
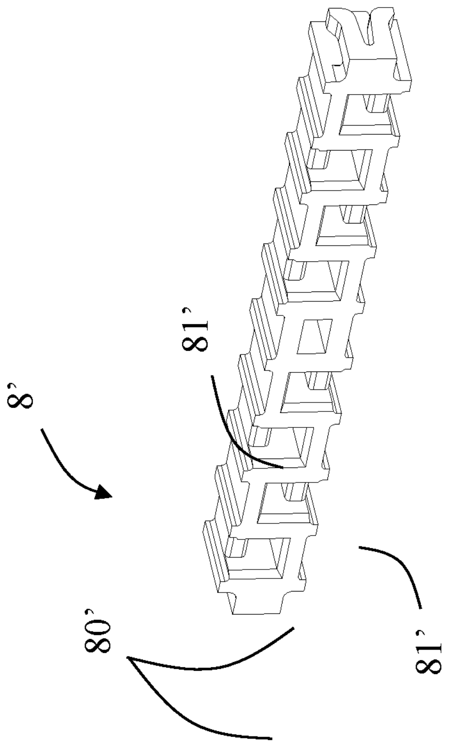
FIG. 3 is a partially exploded perspective view of FIG. 1.
Figure 4:
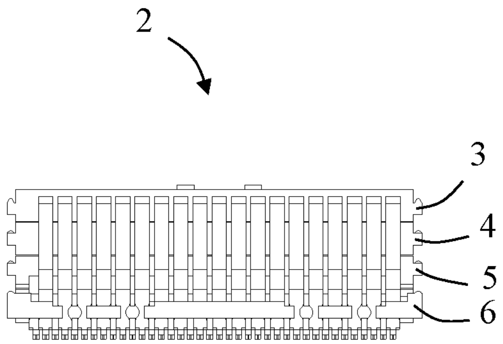
FIG. 4 is a front view of a terminal module in FIG. 3.
Figure 5:
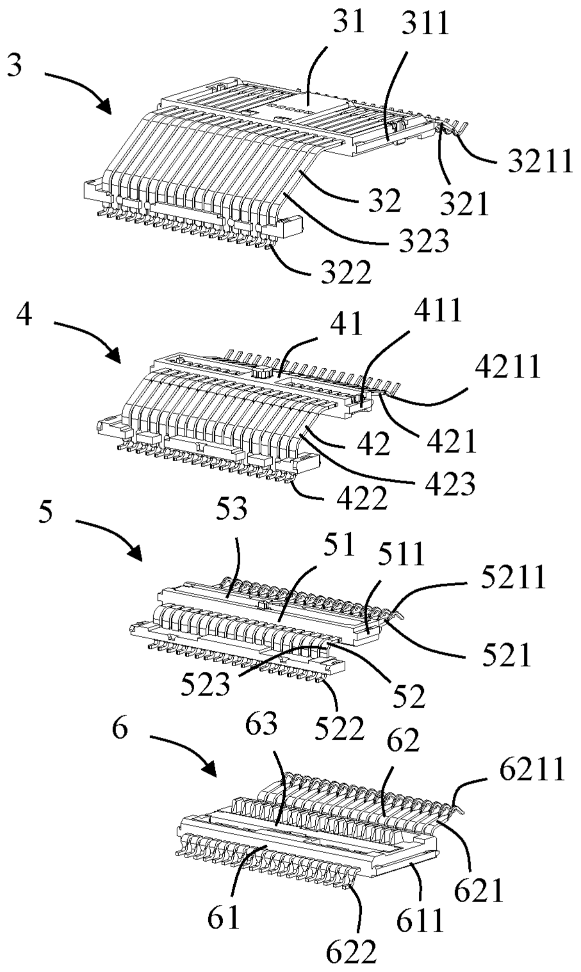
FIG. 5 is a perspective exploded view of the terminal module in FIG. 3.
Figure 6:
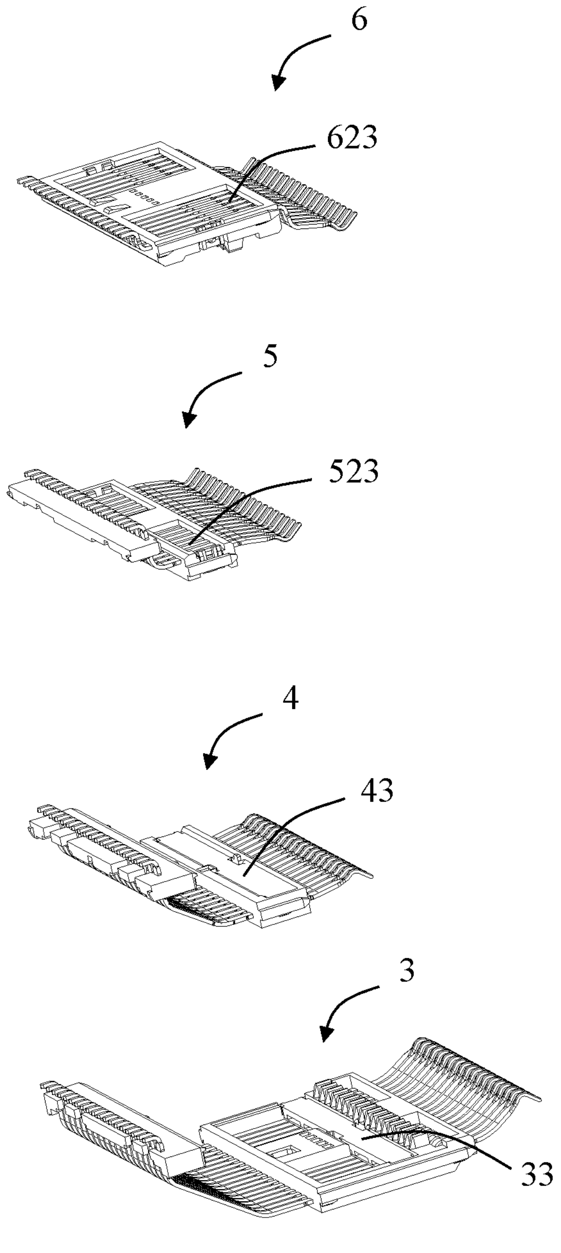
FIG. 6 is an exploded perspective view of FIG. 5 from another angle.

The insulating housing 1 includes a mating surface 11 at a front end, an assembly surface 12 at a rear end and a mounting surface 13 at a bottom end. The insulating housing 1 includes a mating slot 10 extending through the mating surface 11 for mating with a mating connector (not shown). Referring to FIG. 3, the insulating housing 1 includes a receiving space 14 which extends through the assembly surface 12 and is used to receive the terminal module 2. Opposite side walls of the insulating housing 1 are respectively provided with a plurality of guide grooves 15 for guiding and fixing the terminal module 2. The guide groove 15 on each side wall of the insulating housing includes a first guide groove 151, a second guide groove 152, a third guide groove 153 and a fourth guide groove 154 which are arranged along a top-to-bottom direction. The mounting surface 13 is used to mount the electrical connector 100 on a circuit board (not shown).

Referring to FIGS. 5 to 19, in a first illustrated embodiment of the present disclosure, the terminal module 2 includes a first terminal module 3, a second terminal module 4, a third terminal module 5 and a fourth terminal module 6, in which the first terminal module 3 and the fourth terminal module 6 are arranged oppositely, and the second terminal module 4 and the third terminal module 5 are arranged oppositely.

The first terminal module 3 includes a first insulating block 31, a plurality of first terminals 32 disposed in the first insulating block 31, a first lossy member 33 mating with at least some of the first terminals 32, and a first non-conductive layer 34 located between the first terminals 32 and the first lossy member 33. In one embodiment of the present disclosure, the first terminals 32 are insert-molded with the first insulating block 31. It can be understood that, in other embodiments, the first terminals 32 may also be fixed to the first insulating block 31 by assembling. The electrical connector 100 includes a first isolation portion which is a polymer material in some embodiments. The first isolation portion includes the first non-conductive layer 34.

Figure 18:
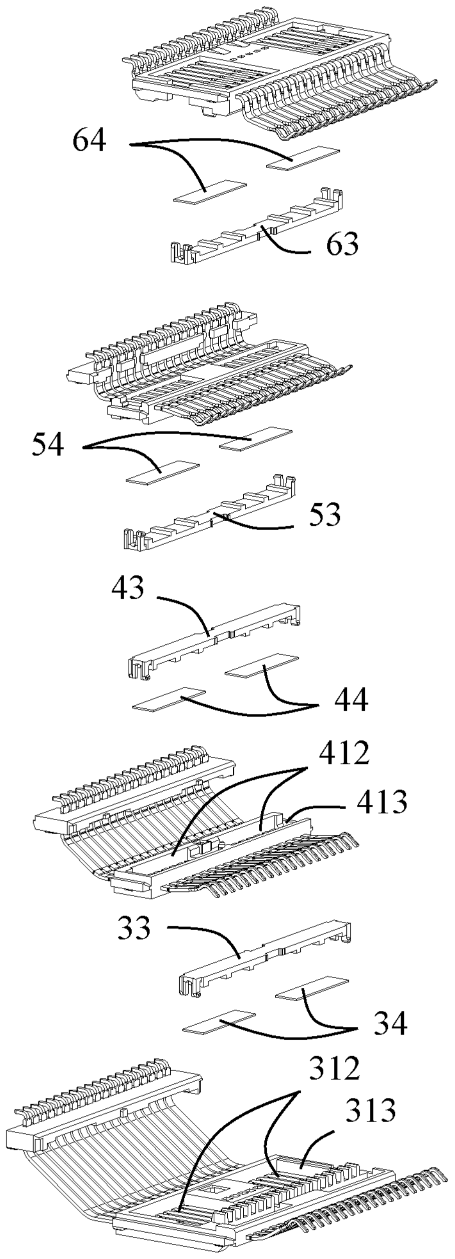
FIG. 18 is an exploded perspective view of FIG. 17 from another angle.

The first insulating block 31 includes a first protrusion 311 on each side thereof. The first protrusions 311 are used to be inserted into the first guide grooves 151 to assemble and positon the first terminal module 3. Referring to FIG. 18, the first insulating block 31 further includes a first opening slot 312 for receiving the first lossy member 33 and first locking slots 313 located at both ends of the first opening slot 312.

From a structural point of view, each first terminal 32 is provided with a first elastic arm 321 extending toward the mating slot 10, a first tail portion 322 for being mounted on the circuit board, and a first connection portion 323 connecting the first elastic arm 321 and the first tail portion 322. The first elastic arm 321 is provided with a first contact portion 3211 protruding into the mating slot 10. The first terminals 32 are supported by the insulating housing 1. In the illustrated embodiment of the present disclosure, the first terminals 32 are supported by the insulating housing 1 via the first insulating block 31. However, in other embodiments, the first terminals 32 can be supported by the insulating housing 1 directly through mounting features.

Figure 7:
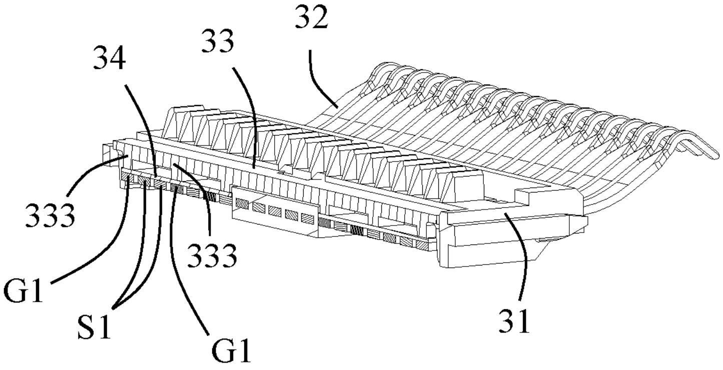
FIG. 7 is a partial perspective cross-sectional view of a first terminal module in FIG. 6.
Figure 8:
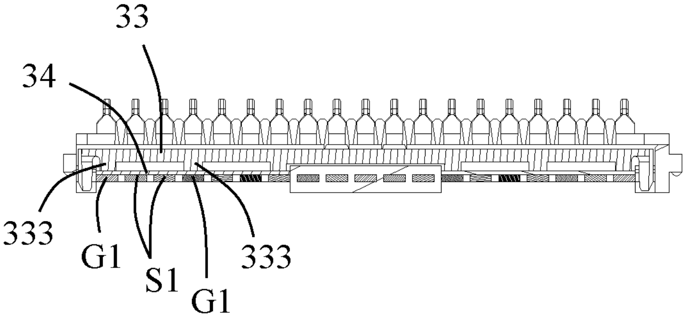
FIG. 8 is a front view of FIG. 7.

Referring to FIGS. 7 and 8, from a functional point of view, the first terminals 32 include at least two first ground terminals G1 spaced apart from each other and a plurality of first signal terminals S1 located between the two first ground terminals G1. The first ground terminals G1 and the first signal terminals S1 are disposed along a first direction (i.e., a left-right direction). In the illustrated embodiment of the present disclosure, the first connection portions 323 of the first ground terminals G1 and the first signal terminals S1 are exposed in the first opening slot 312.

Figure 9:
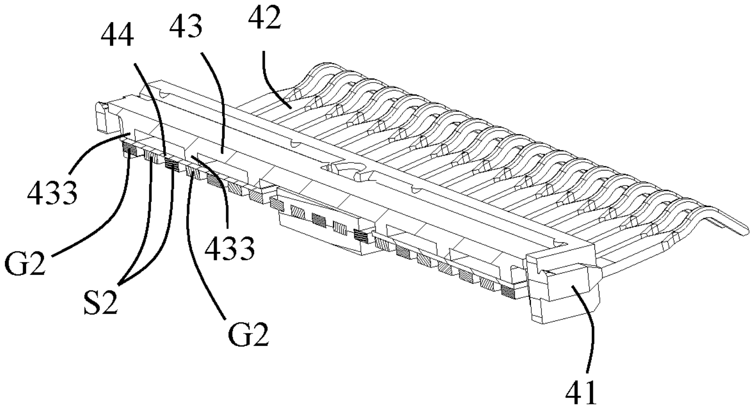
FIG. 9 is a partial perspective cross-sectional view of a second terminal module in FIG. 6.
Figure 10:
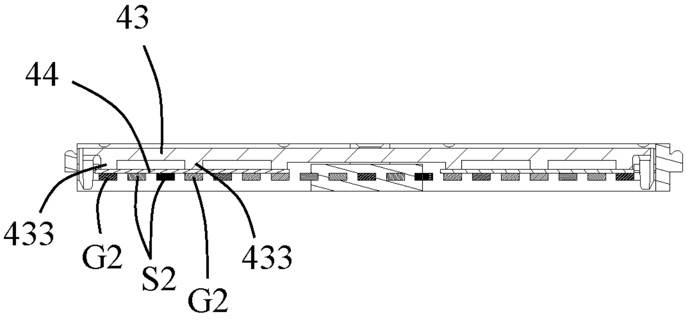
FIG. 10 is a front view of FIG. 9.

Referring to FIGS. 9 and 10, the second terminal module 4 includes a second insulating block 41, a plurality of second terminals 42 disposed in the second insulating block 41, a second lossy member 43 mating with at least some of the second terminals 42, and a second non-conductive layer 44 located between the second terminals 42 and the second lossy member 43. In one embodiment of the present disclosure, the second terminals 42 are insert-molded with the second insulating block 41. It can be understood that, in other embodiments, the second terminal 42 may also be fixed to the second insulating block 41 by assembling. The electrical connector 100 includes a second isolation portion which is a polymer material in some embodiments. The second isolation portion includes the second non-conductive layer 44.

The second insulating block 41 includes a second protrusion 411 on each side thereof. The second protrusions 411 are used to be inserted into the second guide grooves 152 (see FIG. 3) to assemble and positon the second terminal module 4. Referring to FIG. 18, the second insulating block 41 further includes a second opening slot 412 for receiving the second lossy member 43 and second locking slots 413 located at both ends of the second opening slot 412.

From a structural point of view, each second terminal 42 is provided with a second elastic arm 421 extending toward the mating slot 10, a second tail portion 422 for being mounted on the circuit board, and a second connection portion 423 connecting the second elastic arm 421 and the second tail portion 422. The second elastic arm 421 is provided with a second contact portion 4211 protruding into the mating slot 10. The second terminals 42 are supported by the insulating housing 1. In the illustrated embodiment of the present disclosure, the second terminals 42 are supported by the insulating housing 1 via the second insulating block 41. However, in other embodiments, the second terminals 42 can be supported by the insulating housing 1 directly through mounting features.

Referring to FIG. 9 and FIG. 10, from a functional point of view, the second terminals 42 includes at least two second ground terminals G2 spaced apart from each other and a plurality of second signal terminals S2 located between the two second ground terminals G2. The second ground terminals G2 and the second signal terminals S2 are disposed along the first direction (i.e., the left-right direction). In the illustrated embodiment of the present disclosure, the second connection portions 423 of the second ground terminals G2 and the second signal terminals S2 are exposed in the second opening slot 412.

Figure 11:
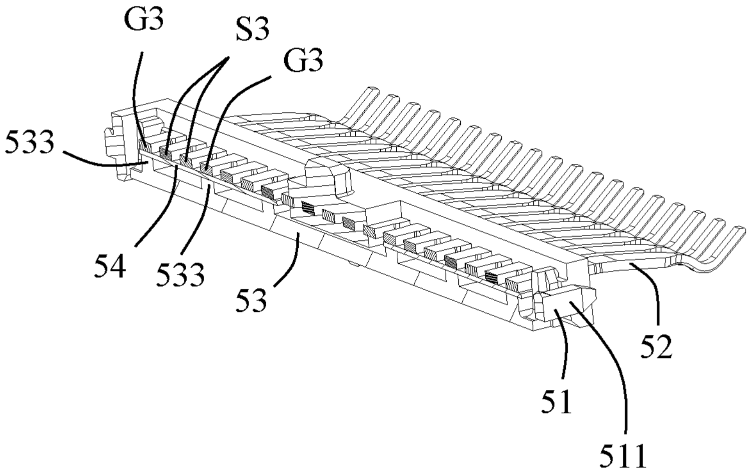
FIG. 11 is a partial perspective cross-sectional view of a third terminal module in FIG. 6.
Figure 12:
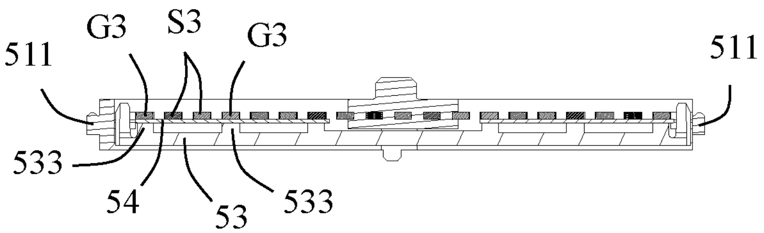
FIG. 12 is a front view of FIG. 11.

Referring to FIGS. 11 and 12, the third terminal module 5 includes a third insulating block 51, a plurality of third terminals 52 disposed in the third insulating block 51, a third lossy member 53 mating with at least some of the third terminals 52, and a third non-conductive layer 54 located between the third terminals 52 and the third lossy member 53. In one embodiment of the present disclosure, the third terminals 52 are insert-molded with the third insulating block 51. It can be understood that, in other embodiments, the third terminal 52 may also be fixed to the third insulating block 51 by assembling. The electrical connector 100 includes a third isolation portion which is a polymer material in some embodiments. The third isolation portion includes the third non-conductive layer 54.

Figure 17:
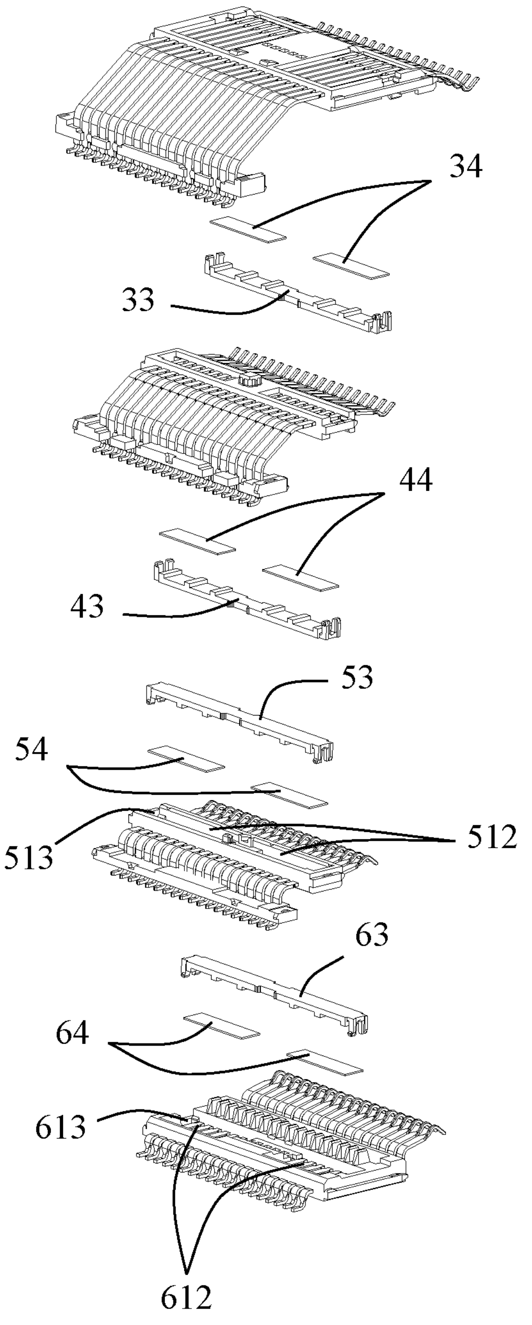
FIG. 17 is a further exploded perspective view of FIG. 15.

The third insulating block 51 includes a third protrusion 511 on each side thereof. The third protrusions 511 are used to be inserted into the third guide grooves 153 (see FIG. 3) to assemble and position the third terminal module 5. Referring to FIG. 17, the third insulating block 51 further includes a third opening slot 512 for receiving the third lossy member 53 and third locking slots 513 located at both ends of the third opening slot 512.

From a structural point of view, each third terminal 52 is provided with a third elastic arm 521 extending toward the mating slot 10, a third tail portion 522 for being mounted on the circuit board, and a third connection portion 523 connecting the third elastic arm 521 and the third tail portion 522. The third elastic arm 521 is provided with a third contact portion 5211 protruding into the mating slot 10. The third terminals 52 are supported by the insulating housing 1. In the illustrated embodiment of the present disclosure, the third terminals 52 are supported by the insulating housing 1 via the third insulating block 51. However, in other embodiments, the third terminals 52 can be supported by the insulating housing 1 directly through mounting features.

Referring to FIGS. 11 and 12, from a functional point of view, the third terminals 52 include at least two third ground terminals G3 spaced apart from each other and a plurality of third signal terminals S3 located between the two third ground terminals G3. The third ground terminals G3 and the third signal terminals S3 are disposed along the first direction (i.e., the left-right direction). In the illustrated embodiment of the present disclosure, the third connection portion 523 of the third ground terminals G3 and the third signal terminals S3 are exposed in the third opening slot 512.

The fourth terminal module 6 includes a fourth insulating block 61, a plurality of fourth terminals 62 disposed in the fourth insulating block 61, a fourth lossy member 63 mating at least some of the fourth terminals 62, and a fourth non-conductive layer 64 located between the fourth terminals 62 and the fourth lossy member 63. In one embodiment of the present disclosure, the fourth terminals 62 are insert-molded with the fourth insulating block 61. It can be understood that, in other embodiments, the fourth terminal 62 may also be fixed to the fourth insulating block 61 by assembling. The electrical connector 100 includes a fourth isolation portion which is a polymer material in some embodiments. The fourth isolation portion includes the fourth non-conductive layer 64.

The fourth insulating block 61 includes a fourth protrusion 611 on each side thereof. The fourth protrusions 611 are used to be inserted into the fourth guide grooves 154 to assemble and position the fourth terminal module 6. Referring to FIG. 17, the fourth insulating block 61 further includes a fourth opening slot 612 for receiving the fourth lossy member 63 and fourth locking slots 613 located at both ends of the fourth opening slot 612.

From a structural point of view, each fourth terminal 62 is provided with a fourth elastic arm 621 extending toward the mating slot 10, a fourth tail portion 622 for being mounted on the circuit board, and a fourth connection portion 623 connecting the fourth elastic arm 621 and the fourth tail portion 622. The fourth elastic arm 621 is provided with a fourth contact portion 6211 protruding into the mating slot 10. The fourth terminals 62 are supported by the insulating housing 1. In the illustrated embodiment of the present disclosure, the fourth terminals 62 are supported by the insulating housing 1 via the fourth insulating block 61. However, in other embodiments, the fourth terminals 62 can be supported by the insulating housing 1 directly through mounting features.

Figure 13:
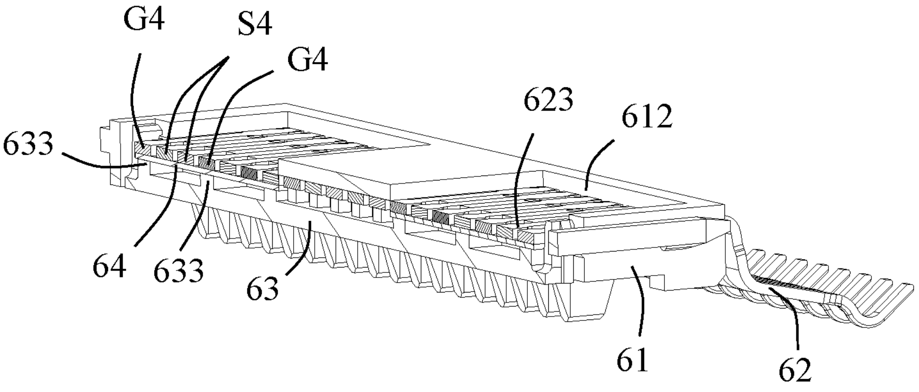
FIG. 13 is a partial perspective cross-sectional view of a fourth terminal module in FIG. 6.
Figure 14:
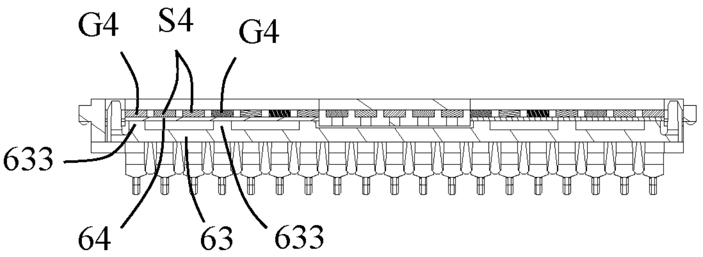
FIG. 14 is a front view of FIG. 13.
Figure 15:
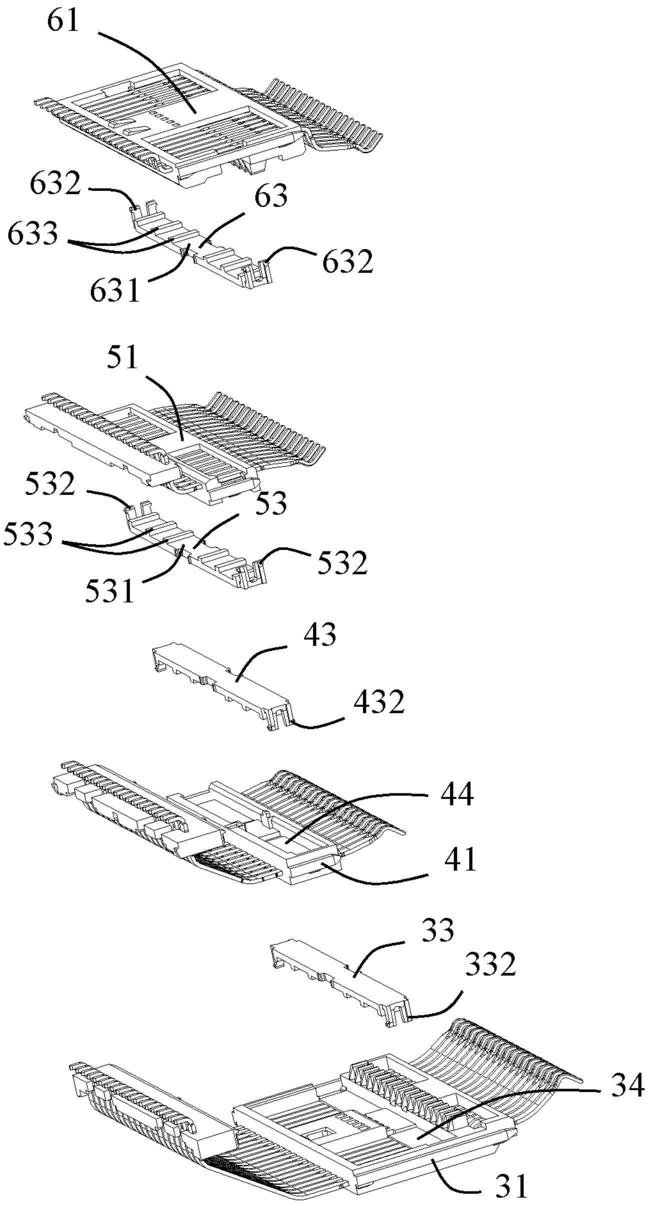
FIG. 15 is a further exploded perspective view of FIG. 6.
Figure 16:
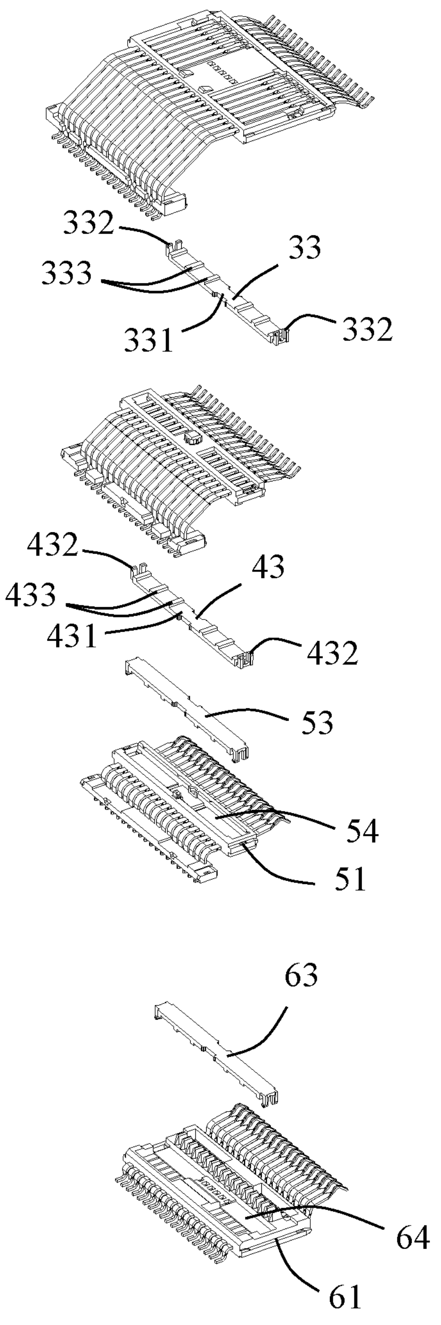
FIG. 16 is an exploded perspective view of FIG. 15 from another angle.

Referring to FIGS. 13 and 14, from a functional point of view, the fourth terminals 62 include at least two fourth ground terminals G4 spaced apart from each other and a plurality of fourth signal terminals located between the two fourth ground terminals G4. The fourth ground terminals G4 and the fourth signal terminals S4 are disposed along the first direction (i.e., the left-right direction). In the illustrated embodiment of the present disclosure, the fourth connection portion 623 of the fourth ground terminals G4 and the fourth signal terminals S4 are exposed in the fourth opening slot 612.

Figure 19:
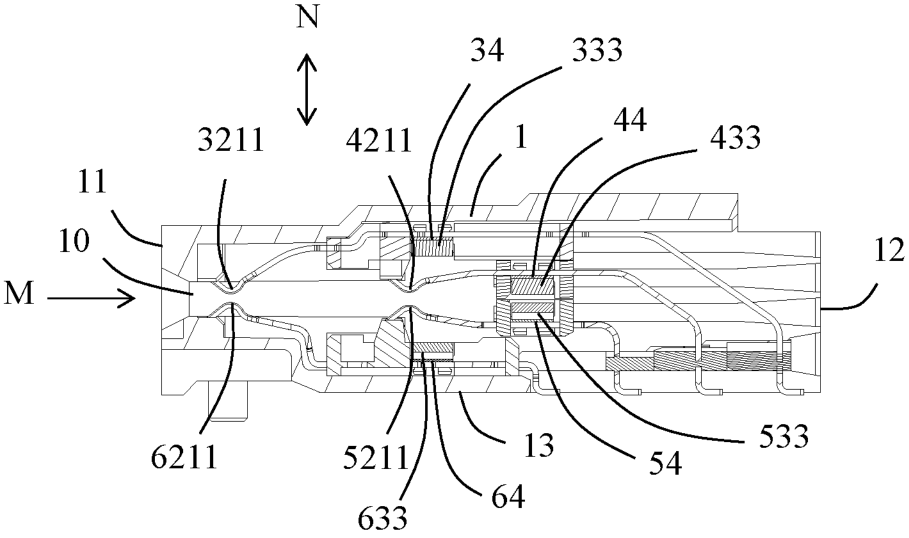
FIG. 19 is a schematic cross-sectional view of the electrical connector along a line A-A in FIG. 1 in accordance with an embodiment of the present disclosure.

Referring to FIG. 19, the first contact portions 3211 and the fourth contact portions 6211 are arranged face to face along a direction N which is perpendicular to the mating direction M. The second contact portions 4211 and the third contacts portion 5211 are arranged face to face along the direction N perpendicular to the mating direction M. In addition, the first contact portions 3211 and the second contact portions 4211 are arranged one behind the other along the mating direction M. The fourth contact portions 6211 and the third contact portions 5211 are arranged one behind the other along the mating direction M.

Referring to FIGS. 15 to 19, the first lossy member 33 includes a first body portion 331 and a plurality of first hook portions 332 extending perpendicularly from two sides of the first body portion 331. The first body portion 331 includes two first ribs 333 formed inside of the first body portion 331 and spaced apart from each other. The two first ribs 333 are in contact with the first non-conductive layer 34, the first non-conductive layer 34 is in contact with the first ground terminals G1, and the first signal terminals Si are located between the two first ribs 333. The first hook portions 332 are clamped and fixed in the first locking slots 313 along a second direction (i.e., a vertical direction) perpendicular to the first direction to fix the first lossy member 33.

The second lossy member 43 includes a second body portion 431 and a plurality of second hook portions 432 extending perpendicularly from two sides of the second body portion 431. The second body portion 431 includes two second ribs 433 formed inside of the second body portion 431 and spaced apart from each other. The two second ribs 433 are in contact with the second non-conductive layer 44, the second non-conductive layer 44 is in contact with the second ground terminals G2, and the second signal terminals S2 are located between the two second ribs 433. The second hook portions 432 are clamped and fixed in the second locking slots 413 along the second direction (i.e., the vertical direction) perpendicular to the first direction to fix the second lossy member 43.

The third lossy member 53 includes a third body portion 531 and a plurality of third hook portions 532 extending perpendicularly from two sides of the third body portion 531. The third body portion 531 includes two third ribs 533 formed inside of the third body portion 531 and spaced apart from each other. The two third ribs 533 are in contact with the third non-conductive layer 54, the third non-conductive layer 54 is in contact with the third ground terminals G3, and the third signal terminals S3 are located between the two third ribs 533. The third hook portions 532 are clamped and fixed in the third locking slots 513 along the second direction (i.e., the vertical direction) perpendicular to the first direction to fix the third lossy member 53.

The fourth lossy member 63 includes a fourth body portion 631 and a plurality of fourth hook portions 632 extending perpendicularly from two sides of the fourth body portion 631. The fourth body portion 631 includes two fourth ribs 633 formed inside of the fourth body portion 631 and spaced apart from each other. The two fourth ribs 633 are in contact with the fourth non-conductive layer 64, the fourth non-conductive layer 64 is in contact with the fourth ground terminals G4, and the fourth signal terminals S4 are located between the two fourth ribs 633. The fourth hook portions 632 are clamped and fixed in the fourth locking slots 613 along the second direction (i.e., the vertical direction) perpendicular to the first direction to fix the fourth lossy member 63.

Since the first terminal module 3, the second terminal module 4, the third terminal module 5 and the fourth terminal module 6 in the illustrated embodiment of the present disclosure are similar in structure, in the following, only the first terminal module 3 is taken as an example for detailed description.

Referring to FIGS. 15 to 19, in an embodiment of the present disclosure, the first non-conductive layer 34 is an insulating film. The first non-conductive layer 34 and the first lossy member 33 are two separated components. The first non-conductive layer 34 is sandwiched between the first ground terminals G1 and the first lossy member 33. In an embodiment of the present disclosure, the first non-conductive layer 34 is laid on the first ground terminals G1 and the first signal terminals S1. With this arrangement, the first lossy member 33 and the first ground terminals G1 may not be in direct contact, which improves the consistency of installation. Besides, by providing the first non-conductive layer 34 which insulates the first lossy member 33 from the first ground terminals G1, general electrical signals are not conducted, and the electrical performance of the electrical connector 100 is improved. In addition, a proper distance is maintained between the first lossy member 33 and the first ground terminals G1 to achieve better grounding effect. At the same time, the first lossy member 33 is not in contact with the first signal terminals S1 so as to avoid signal interference and solve crosstalk resonance. This arrangement improves the consistency of the installation of the first lossy member 33 and the first ground terminals G1, avoids the problem that the first lossy member 33 contacts some first ground terminals G1 and does not contact some other first ground terminals G1, and improves the anti-interference ability of the electrical connector 100.

Figure 20:
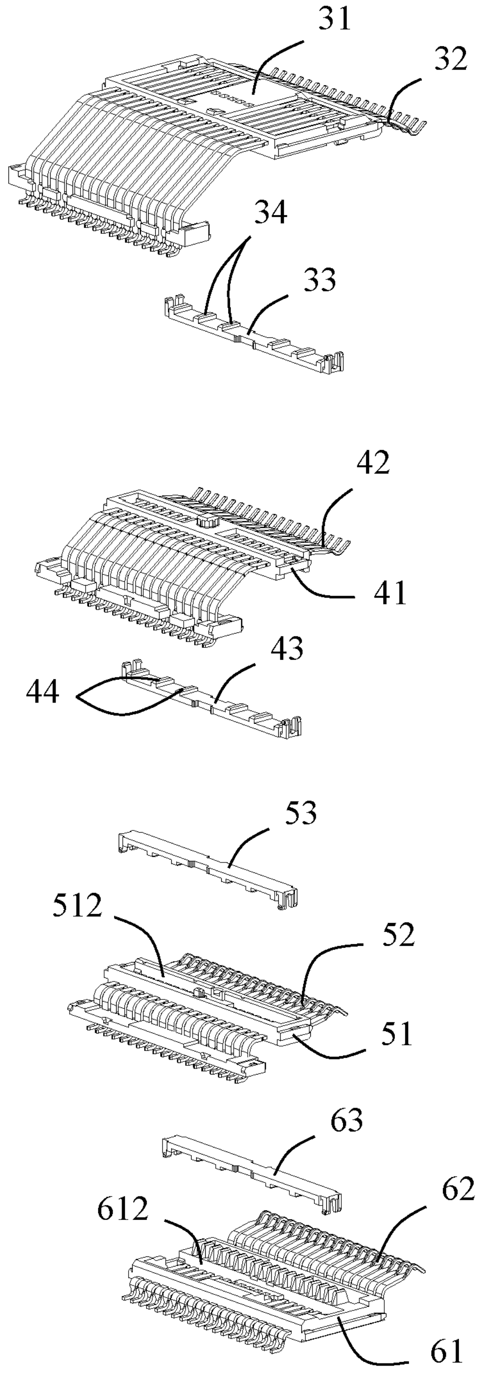
FIG. 20 is an exploded perspective view of FIG. 17 in accordance with a second embodiment of the present disclosure.
Figure 21:
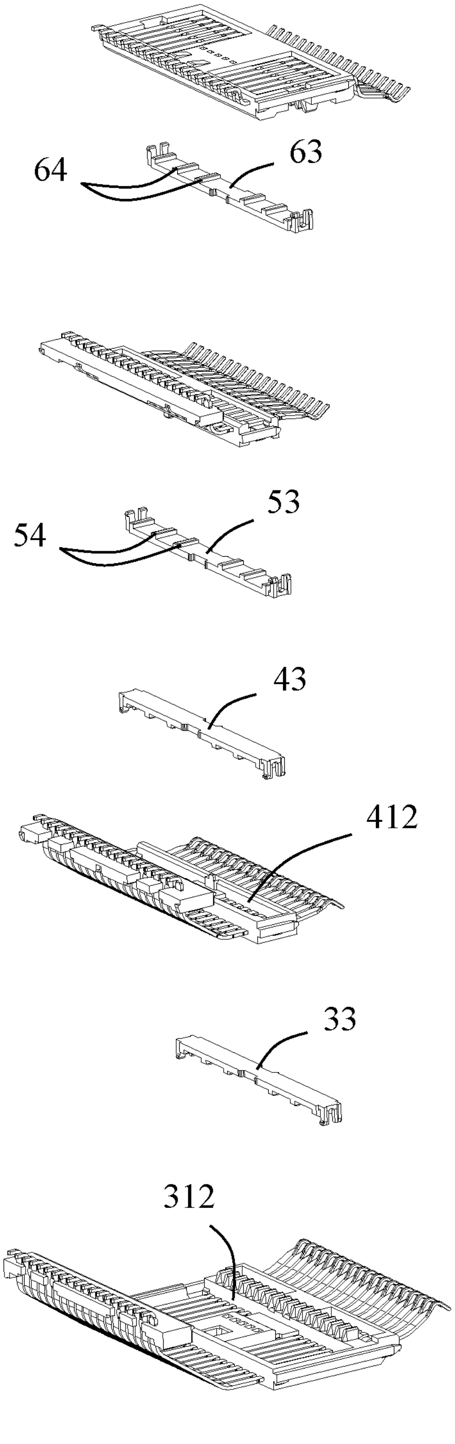
FIG. 21 is an exploded perspective view of FIG. 20 from another angle.
Figure 22:
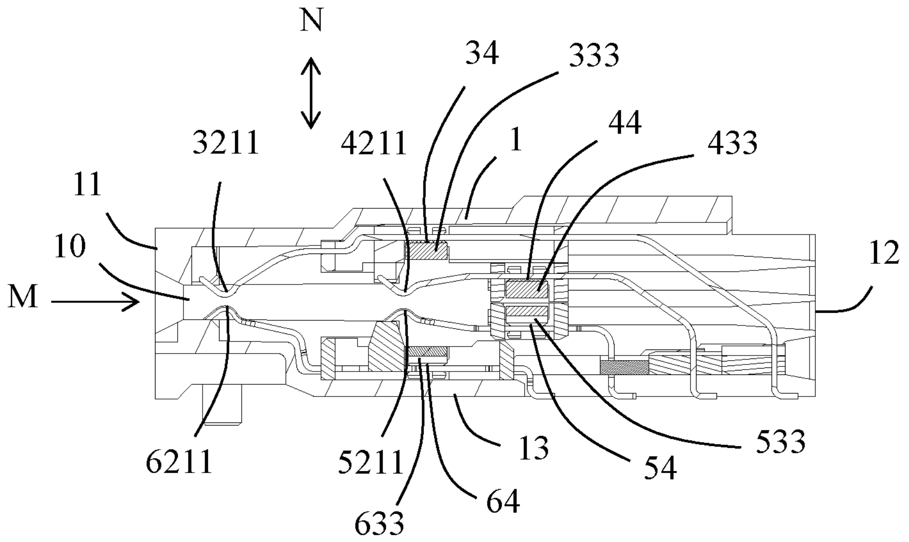
FIG. 22 is a schematic cross-sectional view of FIG. 19 in the second embodiment.
Figure 23:
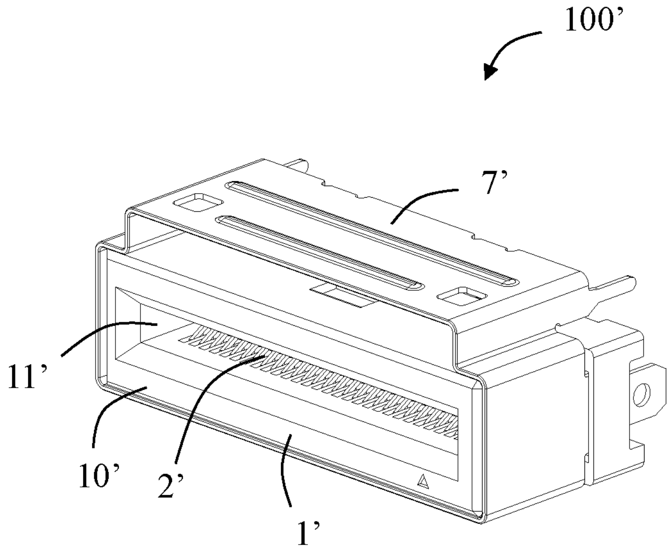
FIG. 23 is a perspective view of an electrical connector in accordance with a second embodiment of the present disclosure.
Figure 24:
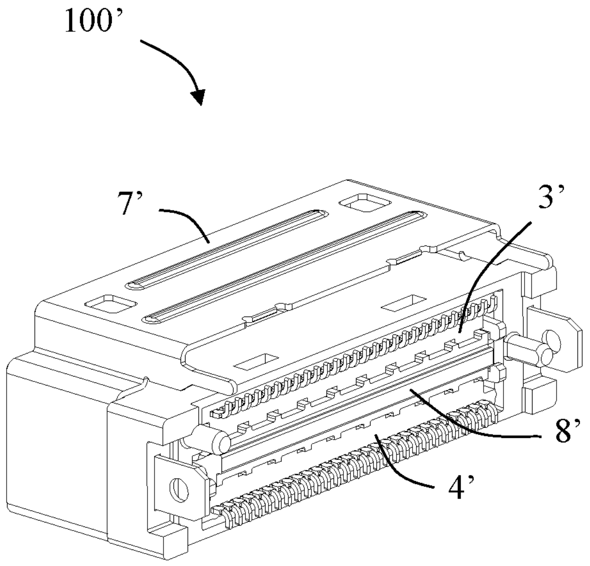
FIG. 24 is a schematic perspective view of FIG. 23 from another angle.
Figure 25:
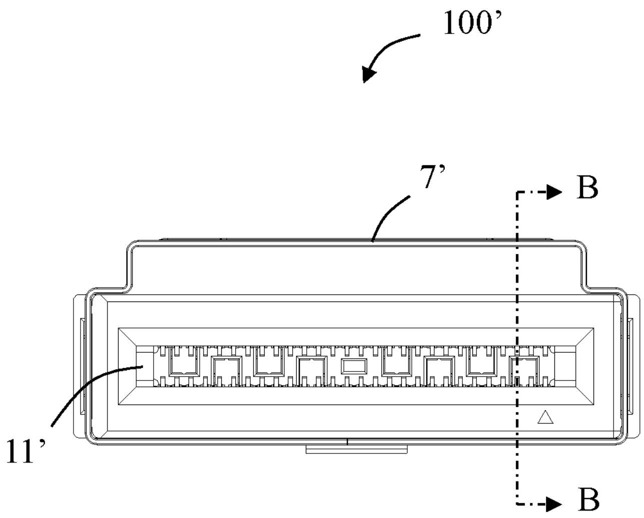
FIG. 25 is a front view of FIG. 23.
Figure 26:
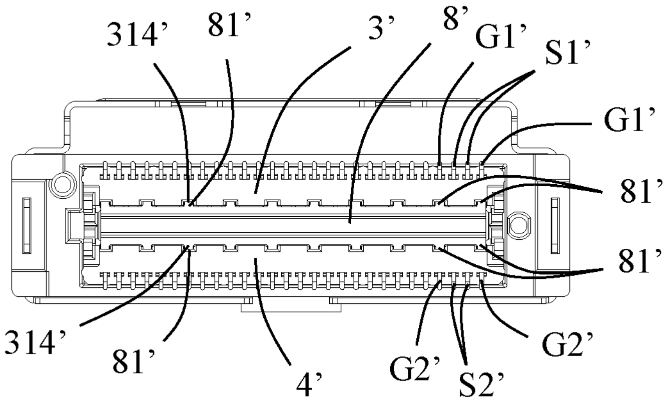
FIG. 26 is a rear view of FIG. 23.

Referring to FIGS. 20 to 22, in another embodiment of the present disclosure, the first non-conductive layer 34 and the first lossy member 33 are fixed together. The first non-conductive layer 34 is in contact with the first ground terminals G1, which can also achieve the object of the present disclosure.

The fixing method of the first non-conductive layer 34 and the first lossy member 33 can be implemented in different ways. For example, Referring to FIG. 22, in one embodiment, the first non-conductive layer 34 is an insulating coating which is coated on the first rib 333 of the first lossy member 33. Under this condition, the first non-conductive layer 34 and the first lossy member 33 are compounded together to form a component. In other embodiments, the first non-conductive layer 34 may also be an insulating film which is fixed to the first rib 333 of the first lossy member 33 by pasting.

In an embodiment of the present disclosure, the material of the first non-conductive layer 34, the second non-conductive layer 44, the third non-conductive layer 54 and the fourth non-conductive layer 64 is Kapton. Kapton is a trade name of polyimide (PI) film material, and it has been already well known to those skilled in the art, so duplicated description is omitted here.

It should be noted that since the terminal module 2 in the specific embodiment of the present disclosure includes a first terminal module 3, a second terminal module 4, a third terminal module 5 and a fourth terminal module 6, in order to facilitate each element to correspond to the reference numerals in the drawings of the specification, elements with names like "first", "second", "third" and "fourth" are used to distinguish them. However, it can be understood that the removal of "first", "second", "third" and "fourth" represents the superordinate concept of these elements. When understanding the protection scope of the patent claims, this logic should be referred to.

Referring to FIGS. 23 to 33, an electrical connector 100' in a second embodiment is disclosed. The electrical connector 100' includes an insulating housing 1', a terminal module 2' mounted to the insulating housing 1' and a metal shell 7' enclosing the insulating housing 1'.

Figure 27:
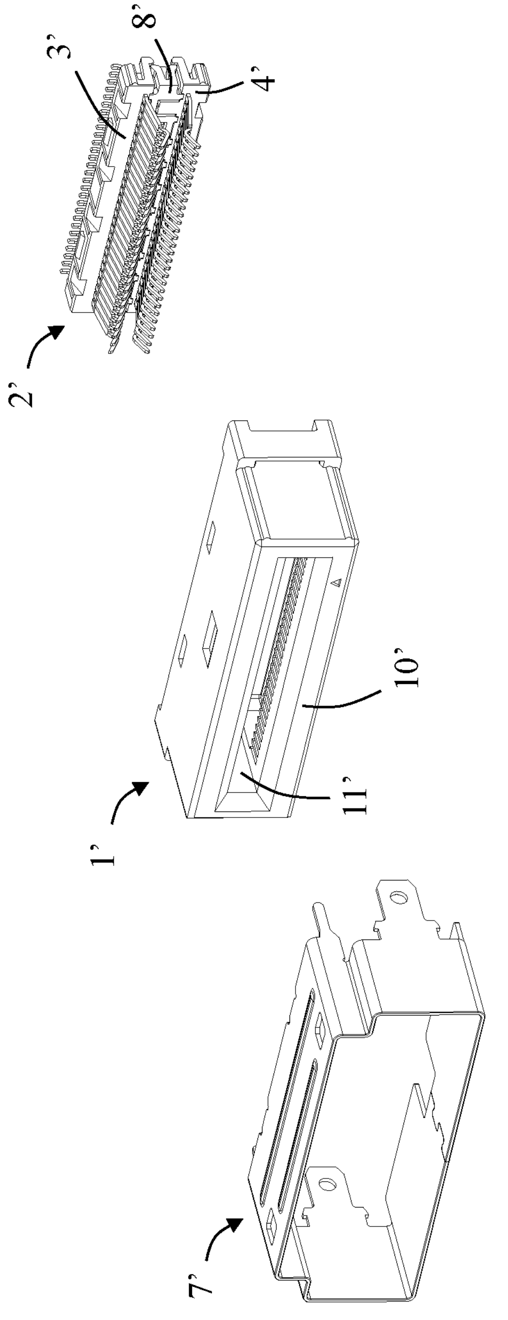
FIG. 27 is a partially exploded perspective view of FIG. 23.
Figure 28:
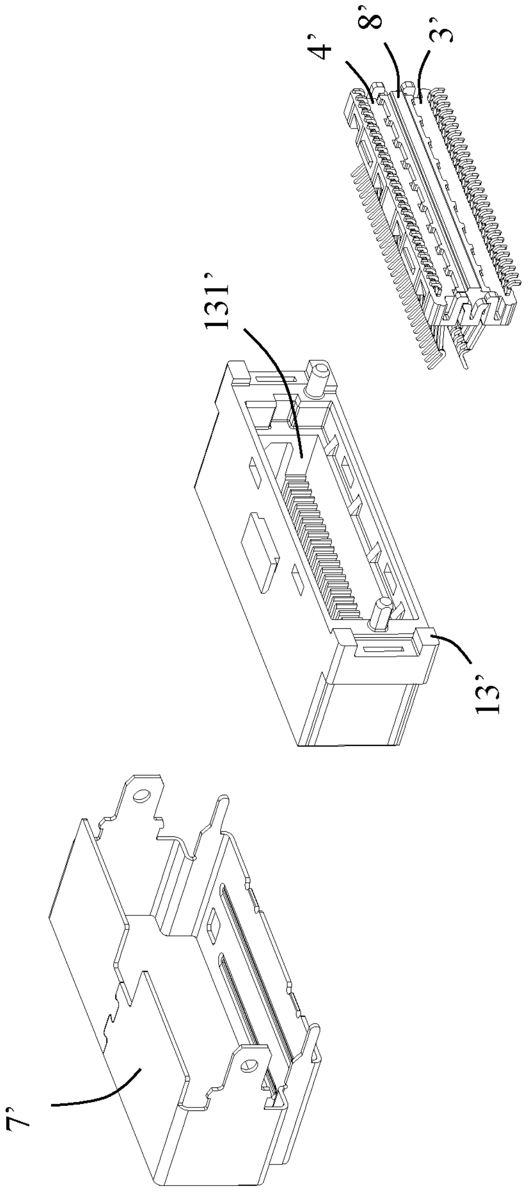
FIG. 28 is a partially exploded perspective view of FIG. 27 from another angle.
Figure 29:
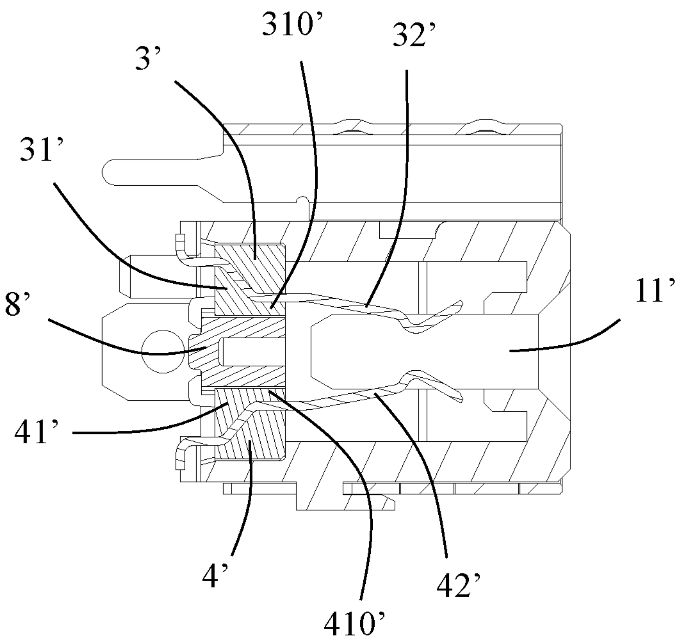
FIG. 29 is a schematic cross-sectional view taken along a line B-B in FIG. 25.
Figure 30:
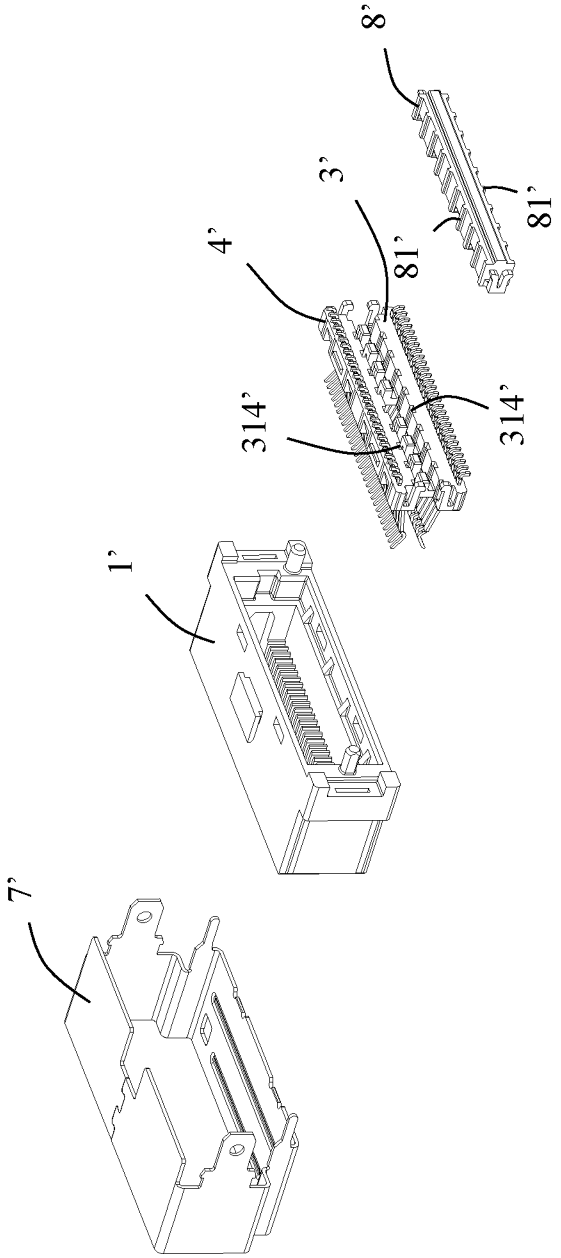
FIG. 30 is a further perspective exploded view of FIG. 28, in which a lossy member is separated.
Figure 31:
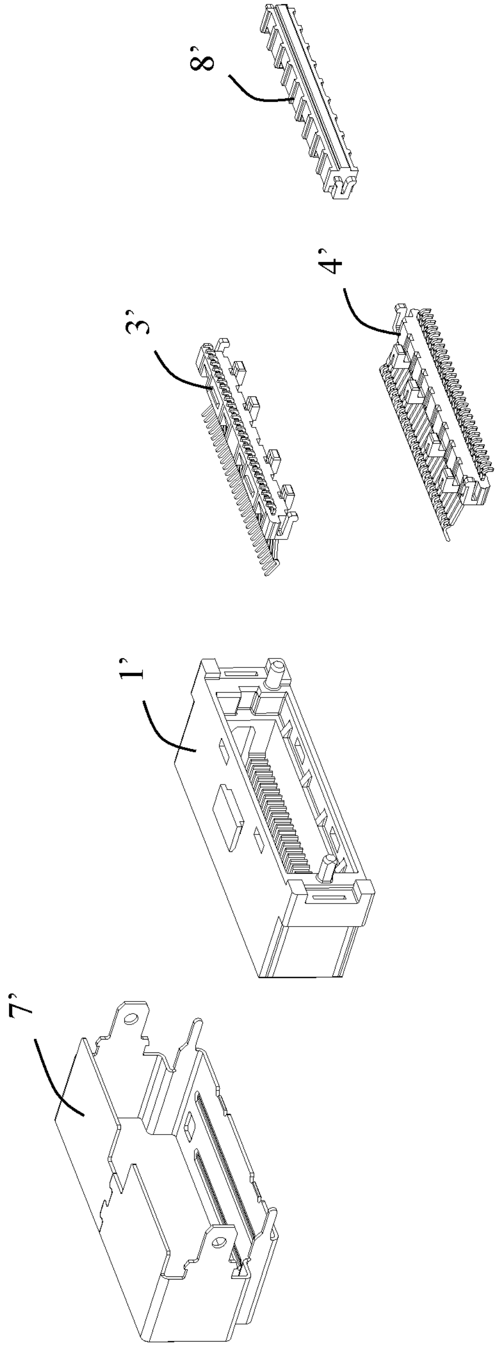
FIG. 31 is a further perspective exploded view of FIG. 30, in which a first terminal module and a second terminal module are separated.

Referring to FIGS. 27 and 28, the insulating housing 1' includes a mating surface 10' and a mounting surface 13' for mounting the electrical connector 100' on a circuit board. A mating slot 11' is formed extending through the mating surface 10' for receiving a mating connector. A mounting groove 131' is formed extending through the mounting surface 13' for receiving the terminal module 2'.

The terminal module 2' includes a first terminal module 3', a second terminal module 4', and a lossy member 8' held between the first terminal module 3' and the second terminal module 4'. The first terminal module 3' includes a first insulating block 31' and a plurality of first terminals 32' disposed in the first insulating block 31'. The first terminals 32' include at least two first ground terminals G1' and a plurality of first signal terminals S1' located between the two first ground terminals G1'. The first insulating block 31' is provided with a first isolation portion 310' which isolates the plurality of first terminals 32' from the lossy member 8'. The first terminals 32' are supported by the insulating housing 1'.

The second terminal module 4' includes a second insulating block 41' and a plurality of second terminals 42' disposed in the second insulating block 41'. The second terminals 42' include at least two second ground terminals G2' and a plurality of second signal terminals S2' located between the two second ground terminals G2'. The second insulating block 41' is provided with a second isolation portion 410' which isolates the plurality of second terminals 42' from the lossy member 8'. The second terminals 42' are supported by the insulating housing 1'.

The lossy member 8' is provided with a plurality of ribs 81' on its upper and lower surfaces. Inner surfaces of the first insulating block 31' and the second insulating block 41' are respectively provided with a plurality of grooves 314' to receive the ribs 81'.

It should be noted that in the illustrated embodiment of the present disclosure, the lossy member 8' is isolated from the first terminals 32' and the second terminals 42' by a layer of plastic (for example, the first isolation portion 310' and the second isolation portion 410'). The ribs 81' of the lossy member 8' do not directly contact the first terminals 32' or the second terminals 42' so as to protect the terminals. At the same time, the first isolation portion 310' and the second isolation portion 410' are used as intermediate media to couple the lossy member 8' with the corresponding first terminals 32' and the second terminals 42'. There is a first distance between the first ground terminals G1' at the first isolation portion 310' and the adjacent rib 81'. The first distance is between 0.01 mm and 0.25 mm. There is a second distance between the second ground terminals G2' at the second isolation portion 410' and the adjacent rib 81'. The second distance is between 0.01 mm and 0.25 mm. These first and second distances allow the first ground terminals G1' and the second ground terminals G2' to establish electrical conduction with the lossy member 8'. Positions of the grooves 314' correspond to positions of the first ground terminals G1' of the first terminal 32' and the second ground terminals G2' of the second terminals 42'.

In some embodiments, the lossy member includes an electrically lossy material, such as a conductive plastic. In some embodiments, the lossy member includes a magnetically lossy material. In some embodiments, the lossy member includes a non-conductive magnetically lossy material, for example, a thin, flexible, high-loss, magnetically loaded, and electrically non-conductive silicone rubber material.

Figure 32:
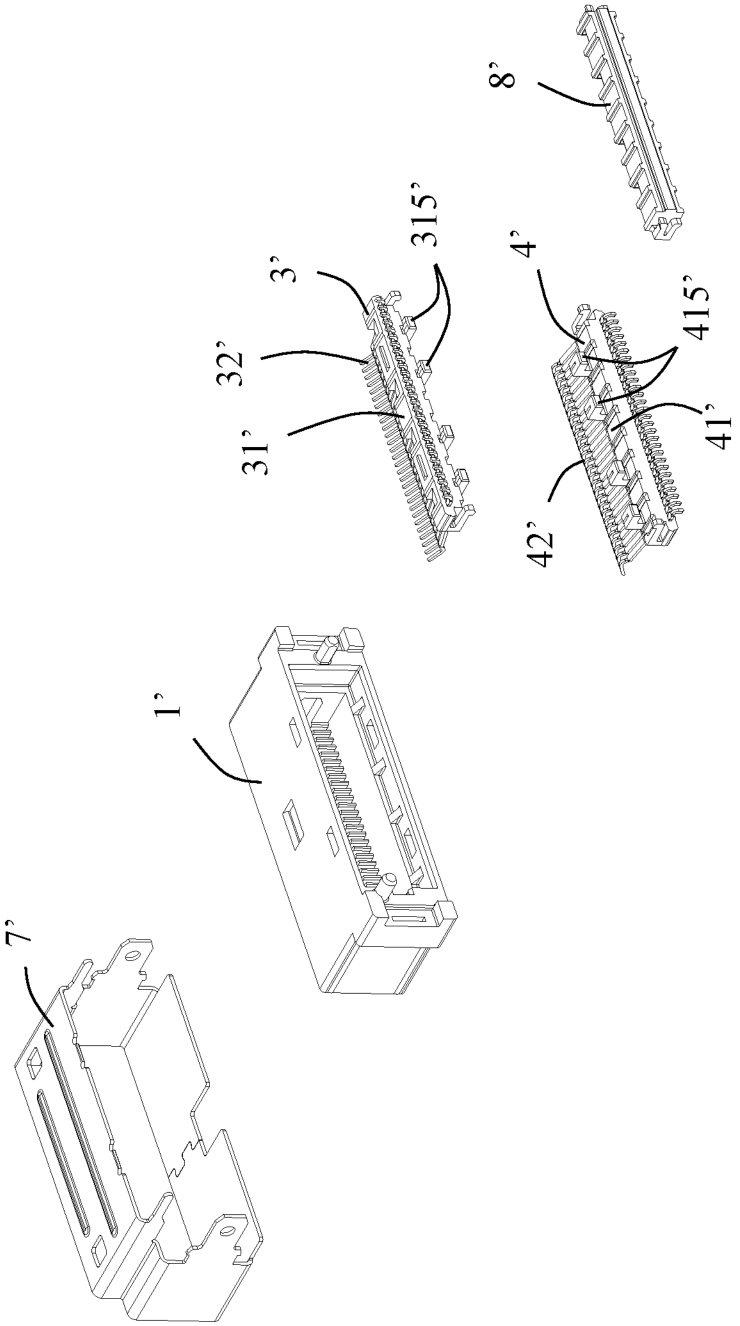
FIG. 32 is an exploded perspective view of FIG. 31 from another angle.
Figure 33:
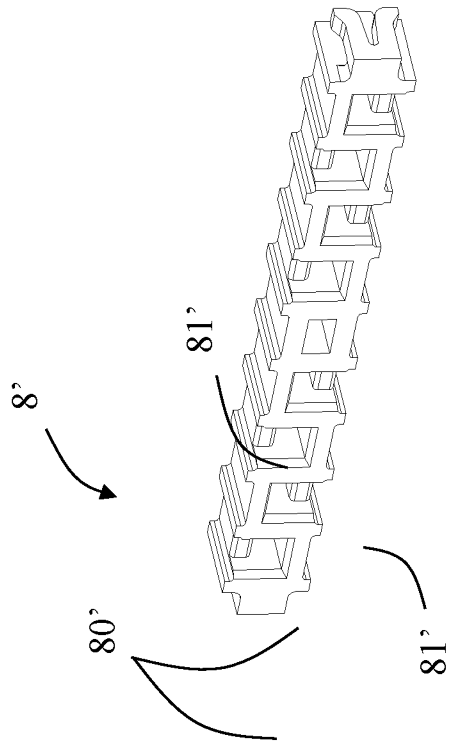
FIG. 33 is a perspective view of the lossy member.

Referring to FIG. 32, the first insulating block 31' includes a plurality of first protrusion posts 315' extending beyond a rear surface of the first insulating block 31'. The second insulating block 41' includes a plurality of second protrusion posts 415' extending beyond a rear surface of the second insulating block 41'. The first protrusion posts 315' and the second protrusion posts 415' are disposed alternately along the first direction a first direction (i.e., the left-right direction). Referring to FIG. 33, the lossy member 8' defines a plurality of holes 80' to receive the first protrusion posts 315' and the second protrusion posts 415'.

The above embodiments are only used to illustrate the present disclosure and not to limit the technical solutions described in the present disclosure. The understanding of this specification should be based on those skilled in the art. Descriptions of directions, such as “front”, “rear”, “top” and “bottom”, although they have been described in detail in the above-mentioned embodiments of the present disclosure, those skilled in the art should understand that modifications or equivalent substitutions can still be made to the application, and all technical solutions and improvements that do not depart from the spirit and scope of the application should be covered by the claims of the application.

What is claimed is:

1. An electrical connector, comprising:
an insulating housing defining a mating slot;
at least one terminal module, the at least one terminal module comprising an insulating block and a plurality of terminals, the plurality of terminals comprising a plurality of ground terminals and a plurality of signal terminals, the ground terminals and the signal terminals being set adjacently to each other along a first direction; and
a lossy member disposed adjacent to the ground terminals;
wherein the ground terminals do not directly contact the lossy member;
wherein each terminal comprises an elastic arm and a connection portion connecting with the elastic arm, the elastic arm comprises a contact portion protruding into the mating slot, the insulating block comprises an opening slot to receive the lossy member, the connection portions of the ground terminals are exposed in the opening slot; and
wherein the insulating block and the lossy member are locked with each other;
wherein one of the insulating block and the lossy member comprises a hook portion, a remaining one of the insulating block and the lossy member comprises a locking slot, and the hook portion and the locking slot are locked with each other.

2. The electrical connector according to claim 1, further comprising a non-conductive layer located between the ground terminals and the lossy member.

3. The electrical connector according to claim 2, wherein the non-conductive layer and the insulating block are two separate components.

4. The electrical connector according to claim 3, wherein the non-conductive layer is an insulating film, the non-conductive layer and the lossy member are two separate components, and the non-conductive layer is sandwiched between the ground terminals and the lossy member.

5. The electrical connector according to claim 4, wherein the non-conductive layer is laid on the ground terminals and the signal terminals.

6. The electrical connector according to claim 2, wherein the non-conductive layer and the lossy member are fixed together, and wherein the non-conductive layer is in contact with the ground terminals.

7. The electrical connector according to claim 6, wherein the non-conductive layer is coated on the lossy member.

8. The electrical connector according to claim 6, wherein the non-conductive layer is an insulating film which is pasted on the lossy member.

9. The electrical connector according to claim 2, wherein the lossy member comprises a body portion which is provided with two ribs formed on an inner side thereof, the two ribs are spaced apart from each other and in contact with the non-conductive layer, the non-conductive layer is in contact with the ground terminals, and the signal terminals are located between the two ribs along the first direction.

10. The electrical connector according to claim 1, wherein the lossy member is assembled to the insulating block along a second direction perpendicular to the first direction.

11. The electrical connector according to claim 1, wherein the lossy member comprises an electrically lossy material or a magnetically lossy material.

12. An electrical connector, comprising:
an insulating housing defining a mating slot;
a first terminal module comprising a first insulating block and a plurality of first terminals, the plurality of first terminals comprise a plurality of first ground terminals and a plurality of first signal terminals, each first terminal being provided with a first elastic arm, and the first elastic arm being provided with a first contact portion protruding into the mating slot;
a second terminal module comprising a second insulating block and a plurality of second terminals, the plurality of second terminals comprise a plurality of second ground terminals and a plurality of second signal terminals, each second terminal being provided with a second elastic arm, and the second elastic arm being provided with a second contact portion protruding into the mating slot;
a third terminal module comprising a third insulating block and a plurality of third terminals, the plurality of third terminals comprise a plurality of third ground terminals and a plurality of third signal terminals, each third terminal being provided with a third elastic arm, and the third elastic arm being provided with a third contact portion protruding into the mating slot;
a fourth terminal module comprising a fourth insulating block and a plurality of fourth terminals, the plurality of fourth terminals comprise a plurality of fourth ground terminals and a plurality of fourth signal terminals, each fourth terminal being provided with a fourth elastic arm, and the fourth elastic arm being provided with a fourth contact portion protruding into the mating slot;

wherein the first terminal module, the second terminal module, the third terminal module and the fourth terminal module are assembled to the insulating housing, the first terminal module is disposed opposite to the fourth terminal module, and the second terminal module is disposed opposite to the third terminal module;

wherein the first contact portion and the fourth contact portion are arranged face to face in a direction perpendicular to a mating direction, and the second contact portion and the third contact portion are arranged face to face in the direction;

wherein the electrical connector further comprises a first lossy member assembled to the first insulating block, a second lossy member assembled to the second insulating block, a third lossy member assembled to the thrid insulating block, and a fourth lossy member assembled to the fourth insulating block;

wherein the first lossy member is disposed adjacent to the first ground terminals but do not directly contact the first ground terminals, the second lossy member is disposed adjacent to the second ground terminals but do not directly contact the second ground terminals, the third lossy member is disposed adjacent to the third ground terminals but do not directly contact the third ground terminals, and the fourth lossy member is disposed adjacent to the fourth ground terminals but do not directly contact the fourth ground terminals;

wherein the electrical connector further comprises a first non-conductive layer, a second non-conductive layer, a third non-conductive layer and a fourth non-conductive layer; the first non-conductive layer is sandwiched between the first ground terminals and the first lossy member; the second non-conductive layer is sandwiched between the second ground terminals and the second lossy member; the third non-conductive layer is sandwiched between the third ground terminals and the third lossy member; and the fourth non-conductive layer is sandwiched between the fourth ground terminals and the fourth lossy member.

13. The electrical connector according to claim 12, wherein the first insulating block defines a first opening slot to receive the first lossy member, each first terminal is provided with a first connection portion connecting with the first elastic arm, and the first connection portion is exposed in the first opening slot;

wherein the second insulating block defines a second opening slot to receive the second lossy member, each second terminal is provided with a second connection portion connecting with the second elastic arm, and the second connection portion is exposed in the second opening slot;

wherein the third insulating block defines a third opening slot to receive the third lossy member, each third terminal is provided with a third connection portion connecting with the third elastic arm, and the third connection portion is exposed in the third opening slot; and wherein the fourth insulating block defines a fourth opening slot to receive the fourth lossy member, each fourth terminal is provided with a fourth connection portion connecting with the fourth elastic arm, and the fourth connection portion is exposed in the fourth opening slot.

14. The electrical connector according to claim 13, wherein the first insulating block defines at least one first locking slot located on a side of the first opening slot along a first direction; and the first lossy member comprises at least one first hook portion locked and fixed in the at least one first locking slot along a second direction perpendicular to the first direction;

wherein the second insulating block defines at least one second locking slot located on a side of the second opening slot; and the second lossy member comprises at least one second hook portion locked and fixed in the at least one second locking slot;

wherein the third insulating block defines at least one third locking slot located on a side of the third opening slot; and the third lossy member comprises at least one third hook portion locked and fixed in the at least one third locking slot; and wherein the fourth insulating block defines at least one fourth locking slot located on a side of the fourth opening slot; and the fourth lossy member comprises at least one fourth hook portion locked and fixed in the at least one fourth locking slot.

15. The electrical connector according to claim 12, wherein the first contact portion and the second contact portion are arranged one after the other along the mating direction; and the fourth contact portion and the third contact portion are arranged one after the other along the mating direction.

16. The electrical connector according to claim 12, wherein the first non-conductive layer and the first lossy member are two separate components;

the second non-conductive layer and the second lossy member are two separate components;

the third non-conductive layer and the third lossy member are two separate components; and the fourth non-conductive layer and the fourth lossy member are two separate components.

17. The electrical connector according to claim 12, wherein the electrical connector further comprises a first non-conductive layer, a second non-conductive layer, a third non-conductive layer and a fourth non-conductive layer;

wherein the first non-conductive layer is an insulating film, the first non-conductive layer and the first insulating block are two separate components, and the first non-conductive layer is sandwiched between the first ground terminals and the first lossy member;

wherein the second non-conductive layer is an insulating film, the second non-conductive layer and the second insulating block are two separate components, and the second non-conductive layer is sandwiched between the second ground terminals and the second lossy member;

wherein the third non-conductive layer is an insulating film, the third non-conductive layer and the third insulating block are two separate components, and the third non-conductive layer is sandwiched between the third ground terminals and the third lossy member; and wherein the fourth non-conductive layer is an insulating film, the fourth non-conductive layer and the fourth insulating block are two separate components, and the fourth non-conductive layer is sandwiched between the fourth ground terminals and the fourth lossy member.

18. An electrical connector, comprising:

an insulating housing defining a mating slot configured to receive a mating connector and mounting space in communication with the mating slot;

a first terminal module comprising a first insulating block and a plurality of first terminals secured to the first insulating block, the plurality of first terminals comprising a plurality of first ground terminals and a plurality of first signal terminals, the first ground terminals and the first signal terminals being set adjacently to each other along a first direction;

the first insulating block defining a plurality of first slots arranged at intervals along the first direction; each first terminal comprising a first elastic arm protruding into the mating slot;

a second terminal module comprising a second insulating block and a plurality of second terminals secured to the second insulating block, the plurality of second terminals comprising a plurality of second ground terminals and a plurality of second signal terminals, the second ground terminals and the second signal terminals being set adjacently to each other along the first direction; the second insulating block defining a plurality of second slots arranged at intervals along the first direction; each second terminal comprising a second elastic arm protruding into the mating slot; the first elastic arms and the second elastic arms being disposed in a face-to-face manner; and a lossy member sandwiched between the first insulating block and the second insulating block; the lossy member comprising a plurality of first ribs inserted into the first slots and a plurality of second ribs inserted into the second slots; the first insulating block, the second insulating block and the lossy member are received in the mounting space of the insulating housing;

wherein the first ground terminals and the second ground terminals do not directly contact the lossy member;

wherein the first insulating block comprises a plurality of first protrusion posts extending beyond a rear surface of the first insulating block; the second insulating block comprises a plurality of second protrusion posts extending beyond a rear surface of the second insulating block; the first protrusion posts and the second protrusion posts are disposed alternately along the first direction; and wherein the lossy member defines a plurality of holes to receive the first protrusion posts and the second protrusion posts.

* * * * *